United States Patent [19]

Shepherd et al.

[11] Patent Number: 6,094,478
[45] Date of Patent: Jul. 25, 2000

[54] METHOD AND SYSTEM FOR EXTENDING THE DIRECTORY NUMBER OF A TERMINAL

[75] Inventors: Paul Shepherd, McKinney; Jin Chen; Sanjay Kulkarni, both of Plano, all of Tex.; Edgar Martinez, Cary, N.C.; James Bender; De D. Cai, both of Dallas, Tex.; Harminder Singh; Laxminarayan G. Iyengar, both of Raleigh, N.C.

[73] Assignee: Nortel Networks Corporation, Montreal, Canada

[21] Appl. No.: 08/912,812

[22] Filed: Aug. 19, 1997

Related U.S. Application Data

[60] Provisional application No. 60/030,314, Nov. 4, 1996.

[51] Int. Cl.⁷ .................................................. H04M 3/56
[52] U.S. Cl. .......................... 379/211; 379/220; 379/230
[58] Field of Search .................................... 379/211, 202, 379/203, 204, 210, 205, 206, 220, 221, 207, 229, 230

[56] References Cited

U.S. PATENT DOCUMENTS

| | | | |
|---|---|---|---|
| 5,206,901 | 4/1993 | Harlow et al. | 379/211 |
| 5,329,578 | 7/1994 | Brennan et al. | 379/211 |
| 5,392,342 | 2/1995 | Rosenthal | 379/211 |
| 5,430,791 | 7/1995 | Feit et al. | 379/211 |
| 5,454,032 | 9/1995 | Pinard et al. | 379/167 |
| 5,475,748 | 12/1995 | Jones | 379/210 |
| 5,487,111 | 1/1996 | Slusky | 379/211 |
| 5,530,931 | 6/1996 | Cook-Hellberg et al. | 379/210 |
| 5,548,636 | 8/1996 | Bannister et al. | 379/211 |
| 5,581,611 | 12/1996 | Yunoki | 379/211 |
| 5,668,862 | 9/1997 | Bannister et al. | 379/211 |
| 5,706,339 | 1/1998 | Eisdorfer et al. | 379/211 |
| 5,802,160 | 9/1998 | Kugell et al. | 379/211 |

FOREIGN PATENT DOCUMENTS

| | | |
|---|---|---|
| 0 588 646 | 3/1994 | European Pat. Off. . |
| 2 274 758 | 8/1994 | United Kingdom . |

*Primary Examiner*—Scott Wolinsky
*Attorney, Agent, or Firm*—Foley & Lardner

[57] ABSTRACT

A method and system are disclosed for extending the directory number of a terminal. The invention allows service providers to provide a service which uses an existing subscriber directory number and effectively extends it to include one or more other directory numbers. To the subscriber, the terminals associated with the other directory numbers effectively look like virtual extensions. The method and system provide this flexibility without requiring any additional personal numbers being assigned to the subscriber. The subscriber can choose to have all incoming calls to a directory number (DN) of one of their existing terminals alert or ring one or more other terminals having a different DN. The terminals may for example be on the same network (e.g. all on the wireline network) or they may be on different networks (e.g. one on the wireline network and one on the wireless network). The method and system are substantially transparent to subscribers and calling parties as no additional numbers or new DNs of any sort are required.

20 Claims, 10 Drawing Sheets

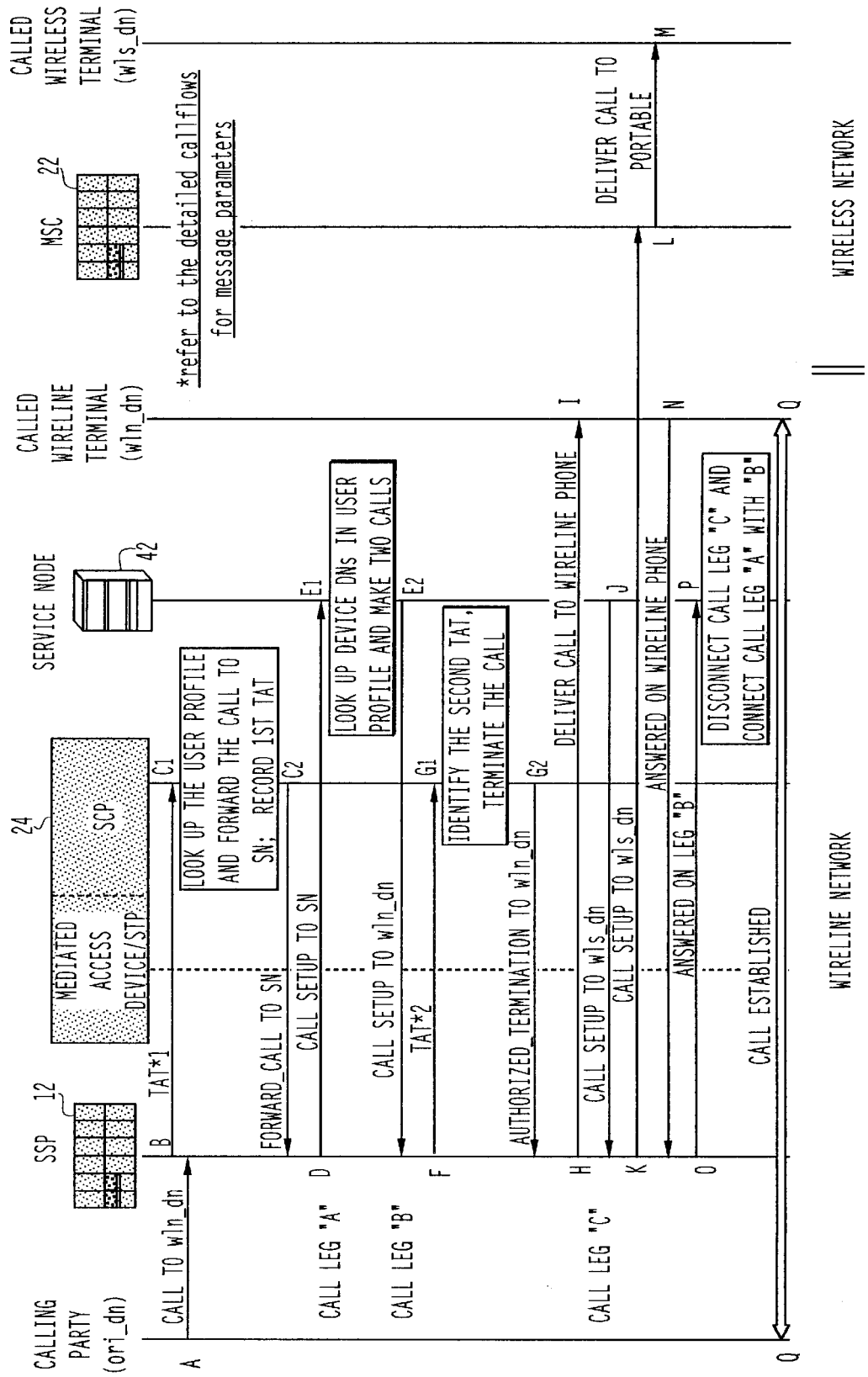

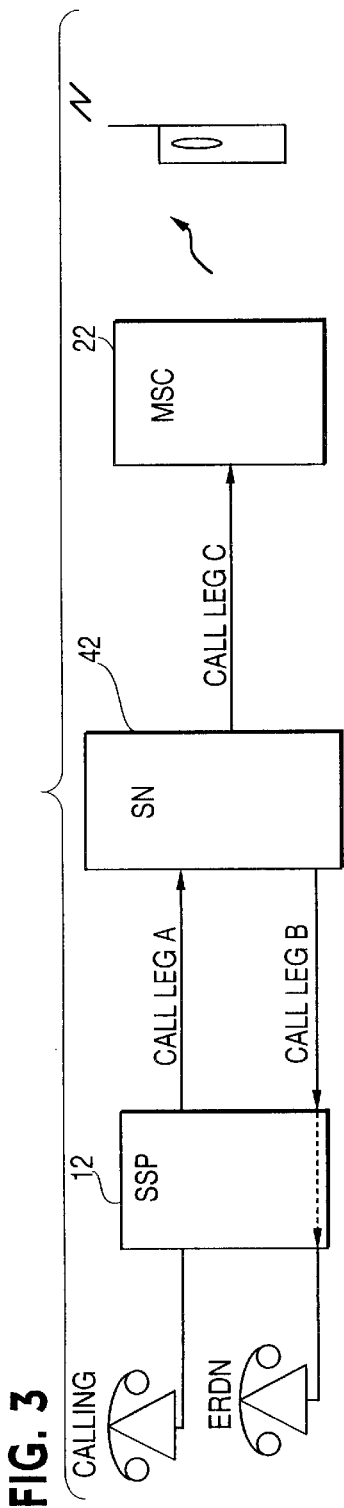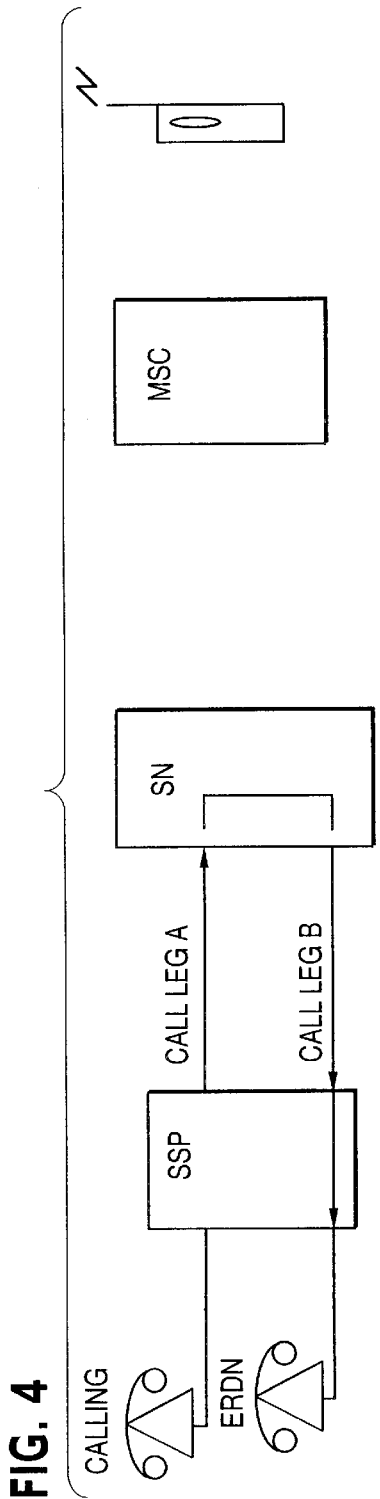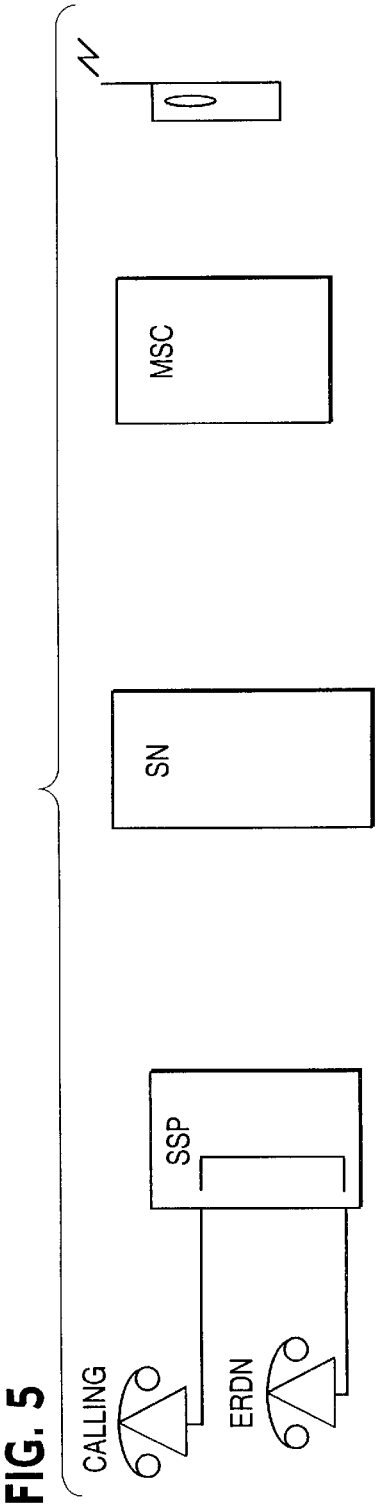

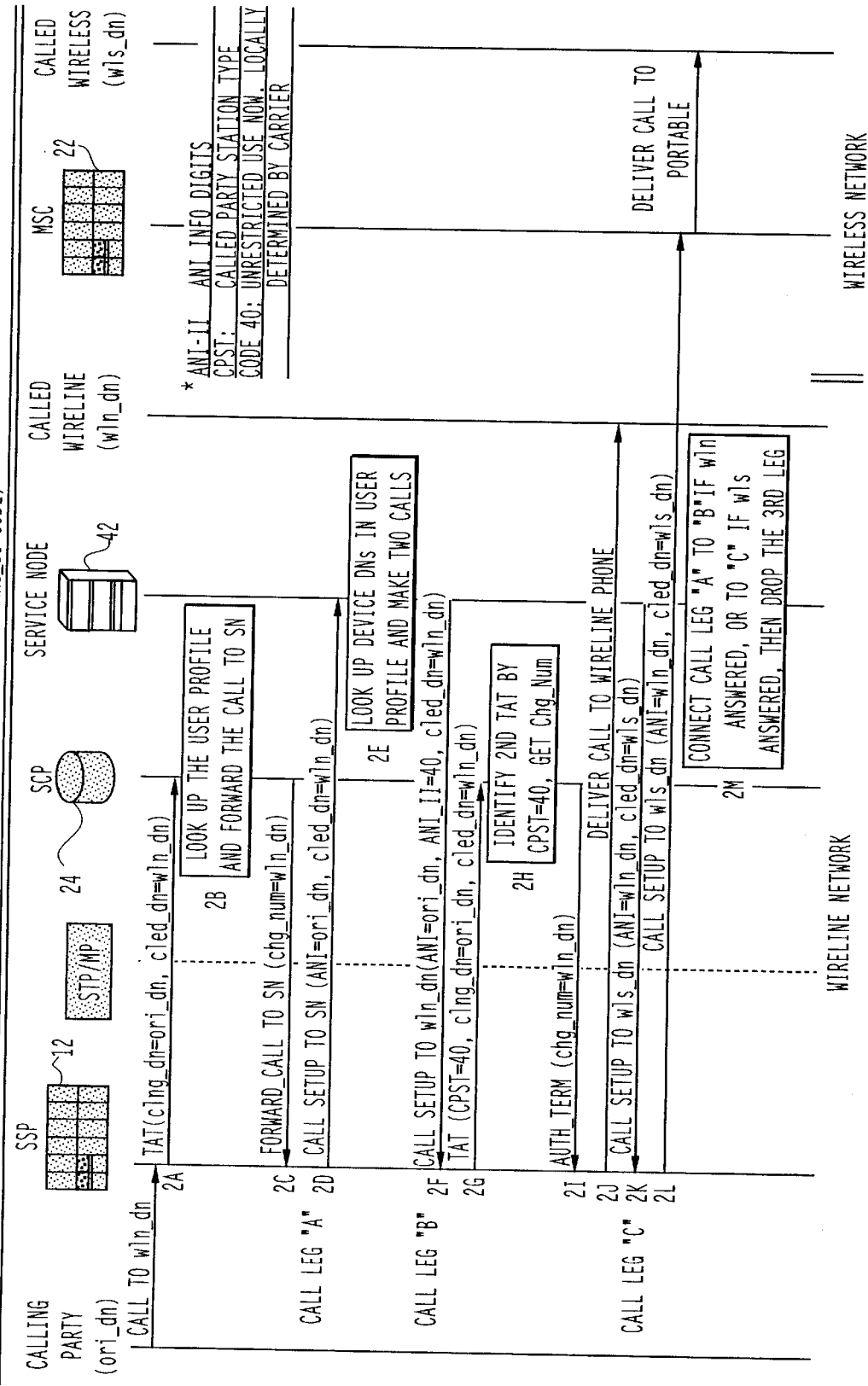

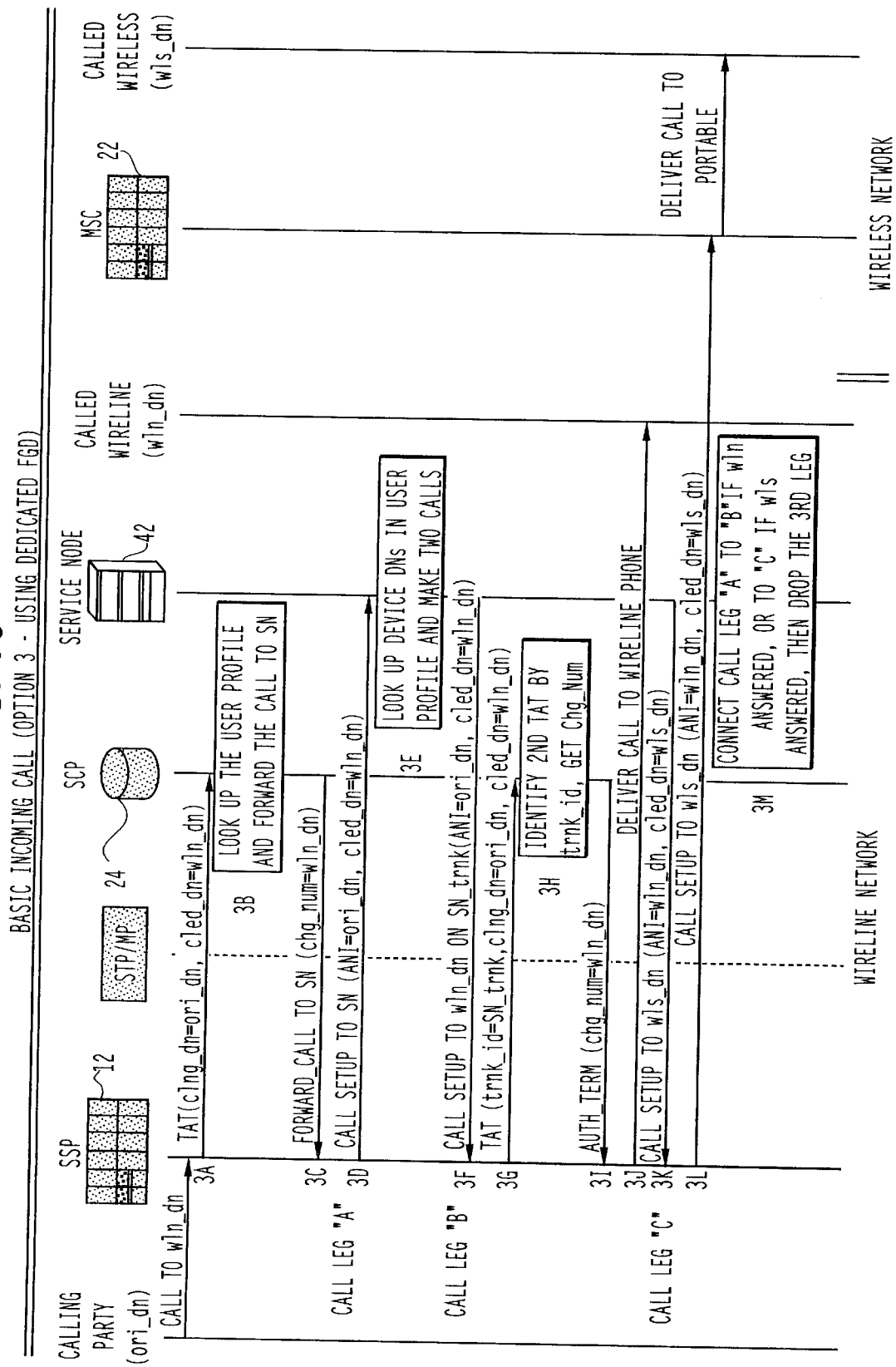

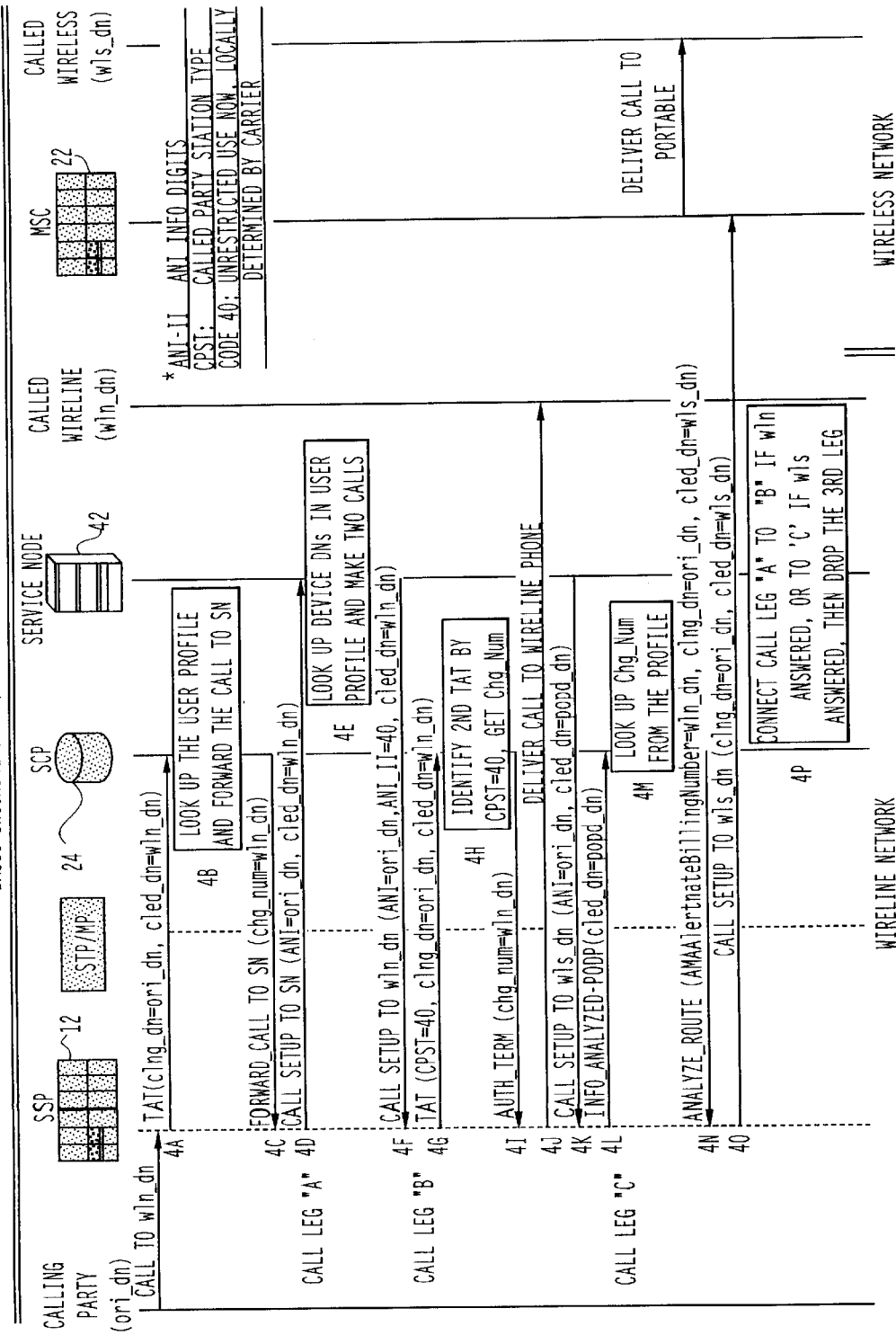

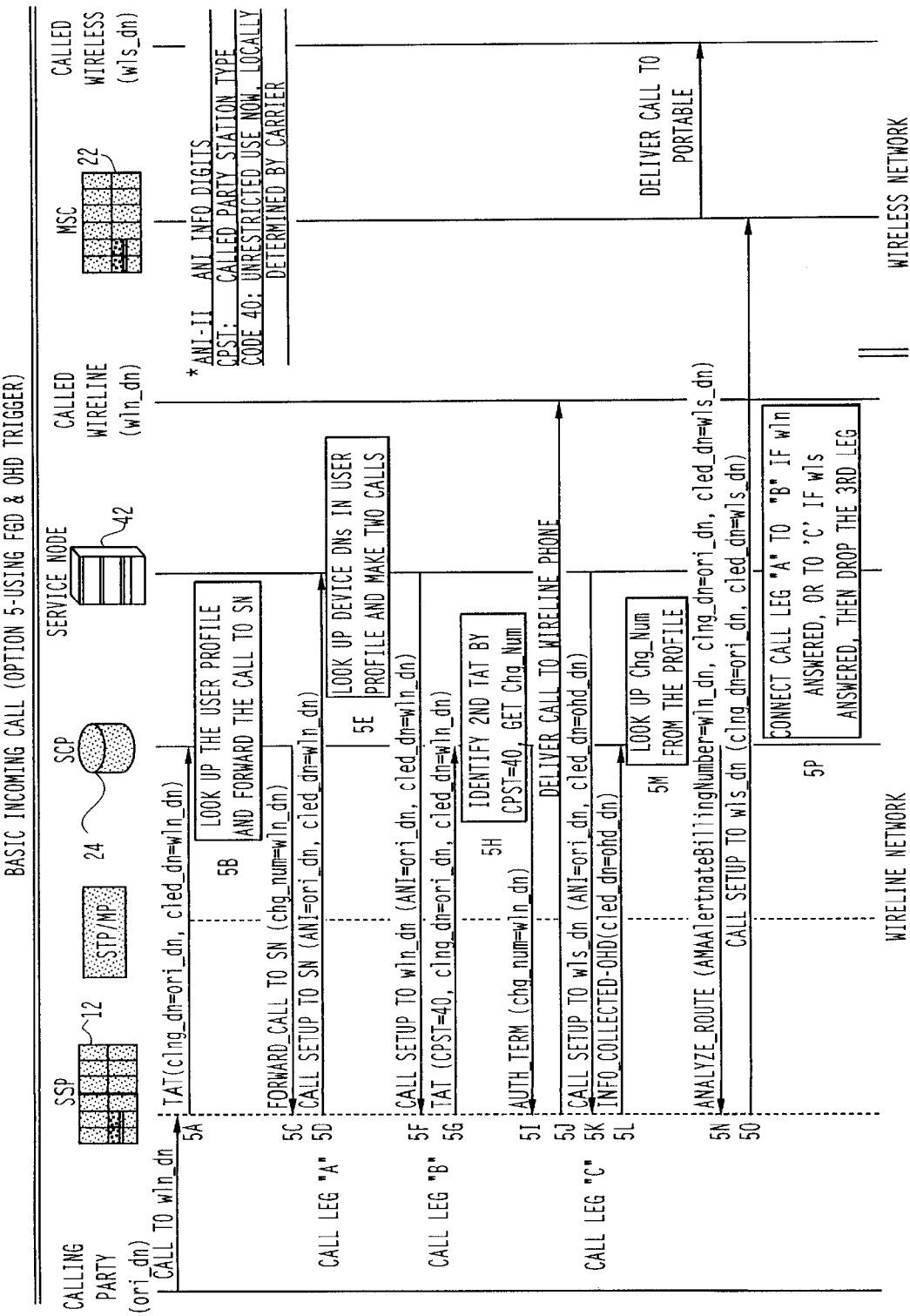

METHOD AND SYSTEM FOR EXTENDING THE DIRECTORY NUMBER OF A TERMINAL

RELATED APPLICATIONS

This application claims the benefit of U.S. Provisional Application Ser. No. 60/030,314, filed on Nov. 4, 1996.

FIELD OF THE INVENTION

This invention generally relates to telephony services and more particularly to a method and system for extending a directory number of one terminal to include one or more terminals each of which has a different directory number.

BACKGROUND OF THE INVENTION

As competition intensifies between service providers of telephony services, providers are looking for services which provide great value and flexibility for their subscribers. Services which increase the likelihood of a calling party reaching the person to whom they wish to contact can provide subscribers with increased flexibility and can increase service provider revenues.

Some service providers today offer flexibility by providing their subscribers with a 1-500 service. The service allows a subscriber to inform a respective service provider which terminals, each of which has a unique directory number (DN), the subscriber wishes to be alerted simultaneously in response to an incoming call to the subscriber's 1-500 number. A directory number is a number which has a direct association with a line appearance on a physical switch and to which a physical terminal is associated. Switch translations are capable of directly translating a DN into a line port or line appearance on a switch within a Wireline or wireless network.

In the event of an incoming call to the special 1-500 number, the service provider's network will correspondingly alert those terminals corresponding to DNs provided by the subscriber and contained in a customer lookup table or profile. The alerted terminal which first responds by going off hook for example is connected to the calling party associated with the incoming call. Incoming calls however, to any of the individual DNs contained in the lookup table or profile rather than the special 1-500 number will however only be routed by the network to the individual terminal corresponding to that DN. Callers who wish to contact a subscriber to the 1-500 service may not be able to if they are unaware of the 1-500 number and the subscriber happens not to be in the physical location corresponding to the individual terminal being called. The 1-500 service is hardly transparent to the subscriber as it requires a separate and additional number.

Other service providers provide their subscribers with substantially the same service by providing a new separate personal telephone number and associate a customer profile to that personal number. The customer profile is used by the service provider's network to assist in the routing of an incoming call to the subscriber's personal number. A caller who is aware of the 'personal number' can attempt to reach the subscriber by dialing their personal telephone number and in much the same way as for the 1-500 service an incoming call to the personal number will be routed according to the subscribers profile to one or more of the subscribers terminals, each of which would have their own DN. The shortfalls of this method are substantially the same as for the 1-500 service. Numbers such as the '1-500' and the 'personal number' described herein are not considered to be directory numbers as defined in this specification.

As the new generation of Personal Communications System (PCS) networks are deployed over the next few years, a key requirement for the operators of these networks will be offering services that provide the greatest possible flexibility. A major opportunity in this area for example for current wireline and wireless service providers is to provide ways to integrate their respective networks while keeping the integration substantially transparent to subscribers of either network. Of particular interest to service providers in general is to be able to provide a service to their subscribers that would allow them to extend a directory number of one terminal to include other terminals having different directory numbers. To the subscriber the service effectively allows them to create one or more virtual extensions to an existing directory number(DN), where each of the virtual extensions or extended DNs have their own unique network DN. Some of the challenges facing the service providers are how to best implement the service from a cost perspective; how to provide the service such that it is transparent to the subscriber; and how to implement the service such that it is also capable of allowing subscribers to extend a DN associated with one network (wireline or wireless) to include a DN on the other network.

SUMMARY OF THE INVENTION

The invention seeks to provide an improved method and system for extending a directory number of one terminal to include another terminal having a different directory number.

According to one aspect of the invention there is provided a method of extending a subscriber directory number to one or more terminals each of which have different network directory numbers, comprising the steps of: a) in response to an incoming call from a calling party to the subscriber directory number associated with a switch, flagging at said switch that the incoming call to the subscriber directory number requires special treatment and temporarily suspending regular call processing; b) determining that the subscriber DN is one which is to be extended to include one or more terminals, each having different network directory numbers; c) determining the DN of all terminals the subscriber DN is to be extended to; and d) initiating call setups to the subscriber directory number and to each DN determined in step 'C' and alerting the terminal associated with the subscriber DN along with the terminals associated with the DN's determined in step 'C'.

According to a further aspect of the invention there is provided a method of extending a subscriber directory number to one or more terminals each of which have different network directory numbers, comprising the steps of: a) in response to an incoming call from a calling party to the subscriber directory number associated with a switch, flagging at said switch that the incoming call to the subscriber directory number requires special treatment; b) determining that the subscriber DN is one which is to be extended to include one or more terminals, each having different network directory numbers; c) determining the DN of all terminals the subscriber DN is to be extended to; and d) initiating call set ups to the subscriber directory number and to each DN determined in step 'C'.

According to yet a futher aspect of the invention there is provided a system for extending a subscriber directory number to one or more terminals each of which have different network directory numbers comprising ; means for flagging at a switch that an incoming call to the subscriber directory number requires special treatment and temporarily suspending regular call processing of the incoming call; means for determining that the subscriber DN is one which is to be extended to include one or more terminals, each having different network directory numbers; means for determining the DN of all terminals the subscriber DN is to be extended to; and means for initiating substantially simultaneously call set ups to the subscriber directory number and to each DN determined in 'C'.

The invention allows service providers to provide a service which uses an existing subscriber directory number and effectively extends it to include one or more other directory numbers. To the subscriber, the terminals associated with the other directory numbers effectively look like virtual extensions. The method and system provide this flexibility without requiring any additional personal numbers being assigned to the subscriber. To a subscriber of such a service the benefits are significant in that the subscriber can choose to have all incoming calls to a DN of one of their existing terminals alert or ring one or more other terminals having a different DN. The terminals may for example be on the same network (e.g. all on the wireline network) or they may be on different networks (e.g. one on the wireline network and one on the wireless network). The method and service are substantially transparent to subscribers and calling parties as no additional numbers or new DN's of any sort are required.

The active subscriber who never wants to miss a call from a business customer or their stock broker for example, can regardless of where they are stay in touch and be reached all without the calling party being required to dial a special additional number. If for example a business terminal DN is the number to which the service is provisioned against then any incoming calls to that DN can also alert a residence terminal. In a preferred embodiment, both the business as well as the residence terminal may be alerted substantially simultaneously and which ever terminal responds to the alerting condition first by going off hook, gets connected to the incoming call.

The method and system allow a wireline carrier or service provider to transparently provide an integrated service with wireless or cellular mobility. For wireless or cellular service providers, it allows for the opportunity to integrate their wireless service offering with a subscriber's existing wired residence or business service.

BRIEF DESCRIPTION OF THE DRAWINGS

The invention will be further understood by reference to the drawings in which:

FIG. 2 illustrates a general call flow within the system of FIG. 1 for extending the directory number of a terminal.

FIG. 3 illustrates three initial call legs set up within the network of FIG. 1 for the general call flow of FIG. 2.

FIG. 4 illustrates a service node connecting two call legs of FIG. 3.

FIG. 5 illustrates an alternative network configuration for connecting two parties associated with the call legs shown in FIG. 4.

FIG. 9 is a more detailed version of the call flow of FIG. 2 and showing a second method of detecting the second TAT trigger.

FIG. 10 is a more detailed version of the call flow of FIG. 2 and showing a third method of detecting the second TAT trigger.

FIG. 11 is a more detailed version of the call flow of FIG. 2 and showing a fourth method of detecting the second TAT trigger.

FIG. 12 is a more detailed version of the call flow of FIG. 2 and showing a fifth method of detecting the second TAT trigger.

DETAILED DESCRIPTION

Figure 1:
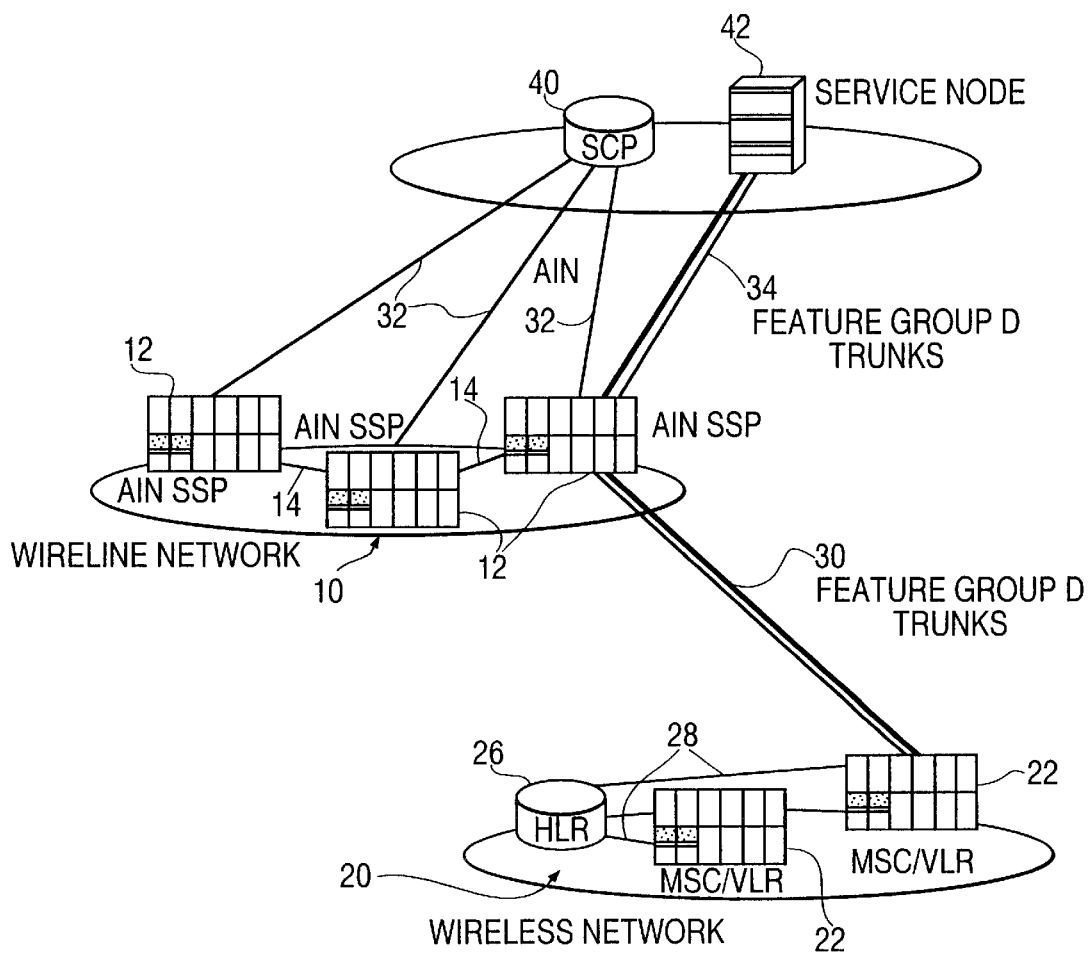
FIG. 1 illustrates a communications network system in accordance with an embodiment of the invention.

The Intelligent Network (IN) architecture has been evolved through the efforts of various groups, in particular Bellcore, European Telecommunications Standards Institute (ETSI), International Telecommunications Union (ITU-T), and American National standards Institute (ANSI). These groups have issued respective documentation defining the general Intelligent Network architecture along with the various entities found within the Network. Advanced Intelligent Network (AIN) is another industry term for the Intelligent Network (IN).

Generally known telecommunication intelligent network entities in existence today along with other terms used in the detailed description are briefly described in general terms below:

SSP—(Service Switching Point) That node in an Intelligent Network normally associated with an end office and equipped with Advanced Intelligent Network (AIN) software. A SSP is generally a central office enhanced with CCS7 messaging links and AIN software which permit it to communicate with application data bases such as Service Control Points (SCP's). Pre-defined Call Processing Triggers in the SSP AIN software result in the SSP initiating queries to network SCP's for information regarding completing call processing of a particular call.

STP—(Signal Transfer Point) A packet switch in the Common Channel Signaling No. 7 (CCS7) Network that enables cost effective routing of CCS7 signals between other network elements (CCS7 nodes).

SCP—(Service Control Point) A centralized network element in the Intelligent Network that individual switches call upon to obtain information and commands necessary for completing an AIN call. The SCP is the intelligence center in an CCS7 AIN network which processes queries for information and returns a response to the originator of the query.

SN—(Service Node) A Service Node is a network node that provides service circuits and generally supports Call Processing type services as well as Operation, Administration & Maintenance type (OA&M) services. For example a SN can provide phone type services such as Advanced Messaging Services, Automatic Call Distribution and Customized Announcements. Service Nodes may also provide OA&M support for SN based services such as customized billing reports, service usage reports and Subscriber changeable service parameters.

IN—(Intelligent Network) A generic term for the Advanced Intelligent Network.

IP—(Intelligent Peripheral) An Advanced Intelligent Networking Network Element that generally only controls a special set of features or provides a specialized set of functions to support features. Intelligent Peripherals are similar to SCP's in that they provide the intelligence to drive AIN features but are more specialized.

MTSO—(Mobile Telephone Switching Office) The location of a switch which controls the operation of a cellular or wireless system. The MTSO, also known as a Mobile Switching Center (MSC) is a cellular switch and is the network entity that provides the actual call capability to a mobile or cellular terminal.

HLR—(Home Location Register) The entity in a cellular network in which a mobile subscriber's main database entry resides. Information in the HLR generally includes the subscribers profile and where the subscriber's mobile terminal is currently located.

VLR—(Visiting Location Register) The entity in a cellular network generally co-located with a MTSO and is used by the cellular network to update a subscriber's HLR with the whereabouts of the subscriber's mobile terminal and is also involved in call delivery to the mobile terminal.

In existence today are wireless networks and wireline networks, each of which are very often owned and operated by different service providers (SP's).

Wireline terminals today have individual directory numbers and are directly linked to switching offices within the wireline network. Wireless or cellular terminals, even though allowed to roam still have individual directory numbers which are directly linked to the terminal's Home Mobile Switching Center (Home MSC), i.e. the MSC in the cellular or Wireless Network to which the public switched telephone network (PSTN) routes the cellular terminals calls. Incoming calls on the wireline network and destined for a wireless terminal are switched or routed to the wireless network. In a similar manner incoming calls on the wireless network and destined for a wireline terminal are routed to the wireline network for delivery to the wireline terminal.

In a preferred embodiment, various end office, AIN software equipped switches referred to as Service Switching Points 12, (SSP) of a typical Wireline network 10 are shown in FIG. 1 interconnected over interoffice trucks 14. It is to be understood that all wireline terminal directory numbers in this description terminate on an SSP 12 within the wireline network 10. A wireless network 20 having multiple Mobile Switching Centers (MSC) 22, each having an integral Visiting Location Register database (VLR) are interconnected in conventional manner over interoffice trucks (not shown). A centralized Home Location Register (HLR) database 26 is connected over data links 28 to each of the MSC's and is thus capable of being accessed by each MSC 22 in the wireless network 20. All wireless terminal directory numbers in this description terminate on a MSC 22 within the wireless network 20. The wireless network 20 is connected to the wireline network 10 over for example a Feature Group D trunk which interconnects one MSC 22 of the wireless network 20 with one SSP 12 of the wireline Network 10.

AIN Network elements in the preferred embodiment which assist in providing the functionality to extend a DN and to integrate the two Networks 10, 20 are provided by a Service Control Point (SCP) 24 and a Service Node or adjunct processor 42. The SCP 24 in this embodiment is centralized and accessed by individual SSPs 12 over BellCore defined AIN 0.1 signaling links. The Service Node 42 in FIG. 1 is shown centralized but may be distributed (i.e. one SN per switch). The SN 42 is connected to each SSP 12 over a separate Feature Group D trunk 34 (for clarity only one connection is actually shown).

FIG. 2 illustrates a general call flow associated with the system of FIG. 1 for a basic incoming call to a DN of a terminal on a wireline network and the simultaneous alerting (ringing) of the wireline terminal and one cellular terminal. Also in this call flow the wireline terminal goes off hook or answers before the wireless terminal and is thus connected to the calling party originating the incoming call. More detailed call flows showing specific messaging and respective parameters will follow.

Network elements shown along the top of all call flows will carry the same numeric designation to identical network elements shown in FIG. 1. Within current day signaling networks Signal Transfer Points (STP) 40 (FIG. 2) may be found between SSPs and SCPs and this interface is shown as a dotted line in the call flow of FIG. 2 and subsequent call flows. In this particular call flow the subscriber of the wireline terminal (residence or business) subscribes to an Extended Directory Number service in accordance with an embodiment of the present invention and hence the wireline DN will become the DN to which this service is associated with or anchored to and will be referred to as the Extended Directory Number (Ext-DN). The Extended Directory service will therefore key off of any incoming call to the Ext-DN. It is expected that the subscriber associated with the Ext-DN will be billed accordingly for the service by their respective Service Provider (SP).

In operation, the wireline subscriber wishing to subscribe to the Extended DN service would notify their respective service provider. The service provider then is provided with the directory number(s) of those additional terminals which the subscriber wishes to be alerted simultaneously with the subscriber's existing wireline terminal, now identified as being the Ext-DN. These additional terminals may be for example, pagers, wireless or other wireline terminals or combinations thereof. In the call flow of FIG. 2, once the subscriber subscribes to the service the DN of their existing wireline terminal becomes the Ext-DN and the terms CallEd DN of an incoming call and Ext-DN become essentially interchangeable as both terms refer to the same physical terminal. The service provider of the Ext-DN then provisions or datafills the respective SSP 12 to identify the subscriber wireline DN as subscribing to the Extended DN Service. Any incoming calls to the Ext-DN would be flagged as requiring special treatment. This is achieved in the preferred embodiment within a current AIN 0.1 equipped SSP 12 by provisioning a 'Termination Attempt' (TAT) trigger detection point (TDP) against the Ext-DN, as will be described.

Referring now to the call flow of FIG. 2, point 'A' in the call flow indicates a calling party initiating a call to the wireline DN which in actual fact has been provisioned by the SP of SSP 12 to be the Ext-DN. The incoming call has been routed to the respective SSP 12 at point 'B' in the call flow. As a result of the TAT trigger detection point being provisioned against the Ext-DN the SSP 12 temporarily suspends call processing of the incoming call at the point in the call processing where the a 'termination attempt' to the Ext-DN is normally made (i.e. before alerting or call connection is made to the Ext-DN). With respect to this particular incoming call this is the first 'termination attempt' to the Ext-DN. The SSP 12 sends ('B') a switch event message, in this particular case a 'termination attempt' message to the SCP 24 to request how to continue with the call processing of this incoming call (C1). The SCP 24 after looking up the user profile associated with the Ext-DN (the CallEd DN) determines that the DN is one which is associated with the Extended DN service and returns (C2) an AIN 'forward Call' message to the SSP 12 with routing instructions to forward the call to Service Node 42. At point 'D' in the call flow the SSP 12 complies by initiating a Call SetUp which routes the incoming call to the SN 42. At point 'E1' the SN 42 examines a user profile associated with the Ext-DN which happens to also be the CallEd DN, to determine which additional DNs have been identified by the subscriber of the service as being virtual extensions to the Ext-DN. At point E2 the SN 42 initiates a Call SetUp via SSP 12 to the wireline Ext-DN and virtually at the same time, at point 'J', also initiates Call SetUp to a wireless DN. As a result of the Call SetUp to the wireline Ext-DN the SSP 12 again detects a termination attempt to the Ext-DN and for the second time in the call processing of the incoming call, sends (at 'F') a 'termination attempt' switch event message, to the SCP 24 to request how to continue with the call processing of the incoming call. The SCP 24 upon detecting (at G1) that this is the second TAT, i.e. the second call attempt to the Ext-DN during the call processing of the incoming call, at G2 responds by returning to the SSP 12 an 'Authorized Termination' message to instruct the SSP 12 to deliver (at 'H') the incoming call to the wireline Ext-DN. The wireline terminal associated with the Ext-DN is alerted in a conventional manner to the incoming call at 'I'. Various methods of how the SCP 24 determines the second TAT will be discussed in detail later in the specification.

At virtually the same time as the SN 42 initiates Call SetUp to the wireline Ext-DN, the SN 42 at point 'J', also initiates Call SetUp to the wireless DN found in the user profile. The SSP 12 at 'K' proceeds with Call SetUp to the wireless DN over the network via 'Feature Group D' trunk 30 and the Mobile Switching Center (MSC) 22 of FIG. 1. At point 'L' the MSC initiates delivery of the call to the wireless terminal and at point 'L' the wireless terminal is alerted to the incoming call.

At this point in the call processing, two terminals each of which has a different DN are simultaneously being alerted in response to the incoming call, the wireline DN (Ext-DN) as well as a wireless DN. There are effectively three call legs in progress as is best illustrated in FIG. 3; Call leg A between the SSP 12 and the SN 42 resulting from the Call SetUp to the SN, Call leg 'B' between the SN 42 and the SSP 12 resulting from the Call SetUp to the wireline DN (the Ext-DN in this case) and Call leg 'C' between the SN 42 and the MSC 22 resulting from the Call SetUp to the wireless DN associated with wireless terminal 23. Next in the call flow of FIG. 2 the wireline terminal (Ext-DN) goes off hook at 'N', before the wireless terminal and the call is answered on call Leg B as shown in FIG. 2 at points 'O-P'. The SN 42 at 'P' connects Call Leg A to Call Leg B to complete the call 'Q' and drops Call Leg C as is best illustrated in FIG. 4. The SN 42 is still involved in the call and when either party in the call goes on hook the SSP 12 and the SN 42 proceed to take down call legs A and B. Service nodes 42 which have release trunking capabilities may send a release trunk message to the SSP 12 requesting it to connect the calling party to the Ext-DN terminal at the SSP (see FIG. 5) thus allowing the SN 42 to drop out of the call once the call is completed.

Figure 6:
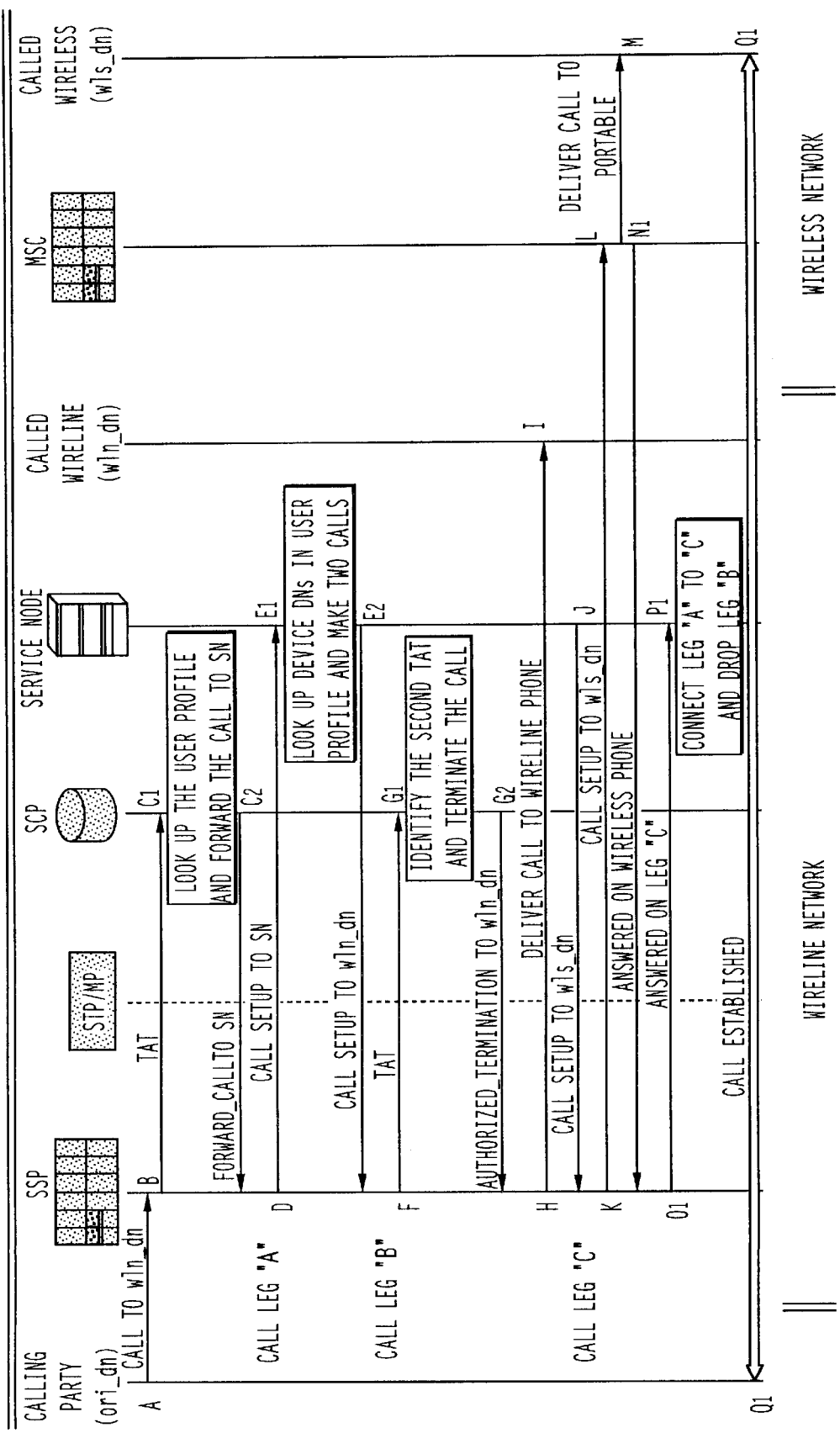
FIG. 6 illustrates how the call flow of FIG. 2 would change if a wireless terminal answers the incoming call.

FIG. 6 illustrates how the call flow of FIG. 2 would change if the wireless terminal answered the call before the wireline terminal. The call flow of FIG. 6 is substantially the same as that of FIG. 2 with differences occurring at N1, O1, P1 and Q1. The incoming call is established at Q1 and is connected to a wireless terminal.

Figure 7:
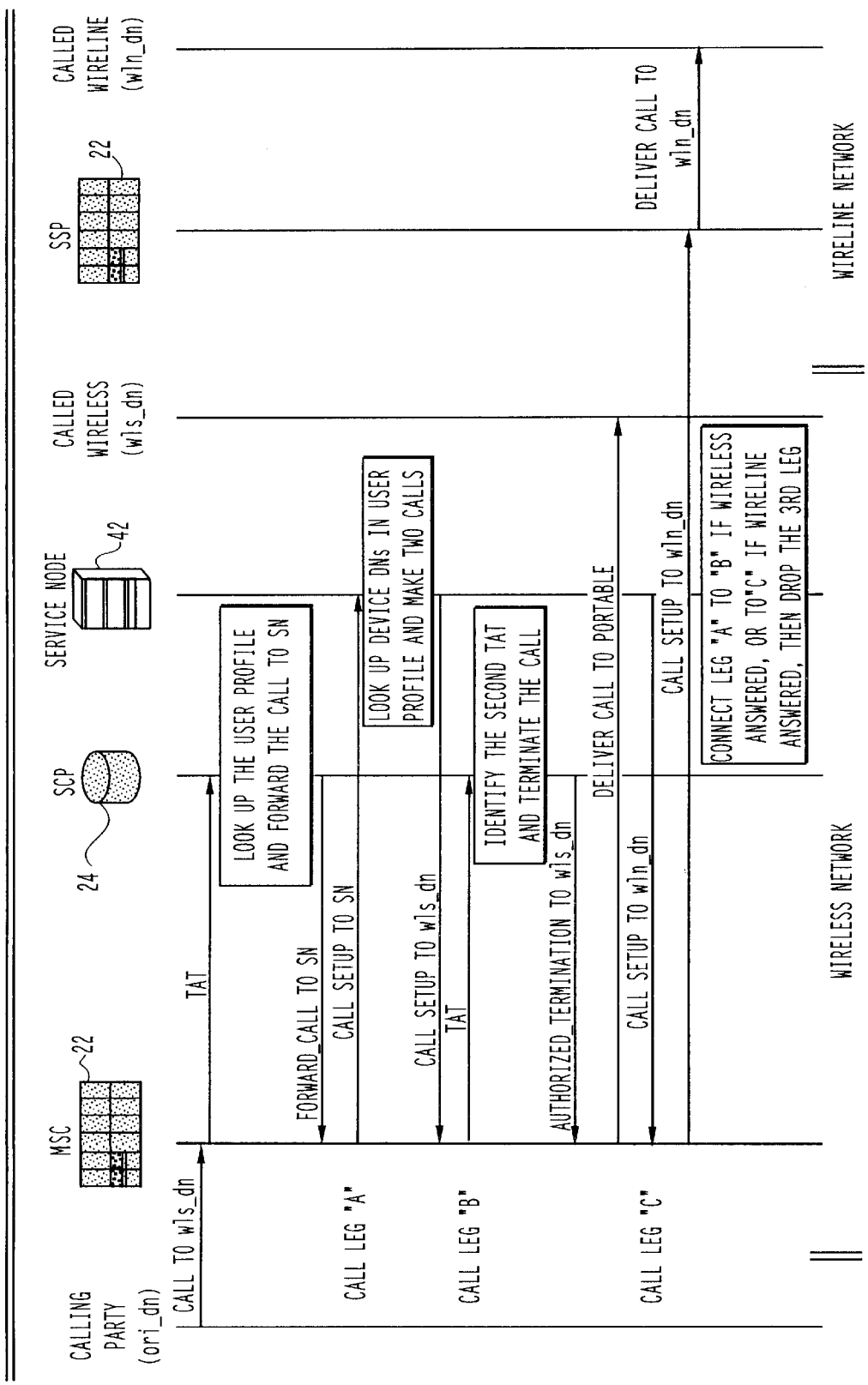
FIG. 7 is representative of a callflow through the network of FIG. 1 where a wireless terminal represents the Extended Directory number.

FIG. 7 is representative of a call flow where the Extended DN Service method anchors the Ext-DN to an existing wireless DN. Although wireless networks as of yet do not have true AIN many still follow the AIN call model and hence in substantially the way can make use of this invention today. For example in many wireless networks a Point in Call (PIC) trigger substantially equivalent of the AIN Termination Attempt Trigger (TAT) exists and is called 'Location Request'. It is expected that in the near future the majority of the wireless networks will adopt AIN functionality directly for business reasons. For ease of understanding, the AIN trigger terminology, e.g. Termination Attempt Trigger has been used in the call flow of FIG. 7. The call flow follows from the description of the call flow of FIG. 2 except for the incoming call now arrives at the MSC 22 and it is the MSC 22 that interacts with the SCP 24 an SN 42 in the same way as the SSP 12 did in the embodiment of FIG. 2. As the call flow is substantially identical to that of FIG. 2, the reader is asked to refer to the detailed description for FIG. 2.

Advantageous use of the Termination Attempt Trigger (TAT) is made in the embodiments of the invention illustrated in call flows of FIGS. 2 & 6 and similarly for FIG. 7. The TAT is sent twice by the SSP 12 to the SCP 24; the first time when the incoming call initially arrives at the SSP 12 (point B of FIGS. 2 & 6) and the second time when the Service Node 42 sets up a call to the wireline DN at point F of FIGS. 2 & 6. The SCP 24 must distinguish therefore between the arrival of the first and second TAT since different processing by the SCP 24, is required for each. It is also expected that Service Providers will bill the DN to which this service is anchored to, i.e. the Ext-DN; in the example embodiment of FIGS. 2 & 6 the Ext-DN is the wireline DN and in FIG. 7 the Ext-DN is the wireless DN. Delivery of the correct billing information, therefore, for call legs to and from the SN 42 is desirable. Service Providers are as well expected to want to present the originating party DN to the CallEd wireline or wireless telephone.

FIGS. 8 through 12 are substantially identical to FIG. 2 and respectively illustrate in further detail, five advantageous methods of handling the SSP 12 to SCP 24 AIN messaging and FGD trunk signaling used for the proper delivery of the basic incoming call. In FIGS. 8–12, identical network elements to FIG. 2, will carry the same feature number. Service Providers will choose among these methods based on a variety of considerations and tradeoffs. For example, the method illustrated in FIGS. 8, 9 & 10 require the use of a single AIN trigger but do not facilitate presentation of the calling (originating) DN to the wireless telephone. The methods illustrated in FIGS. 11 & 12 however provide the additional value of being able to present the originating party DN to the wireless telephone but require an additional AIN trigger.

Figure 8:
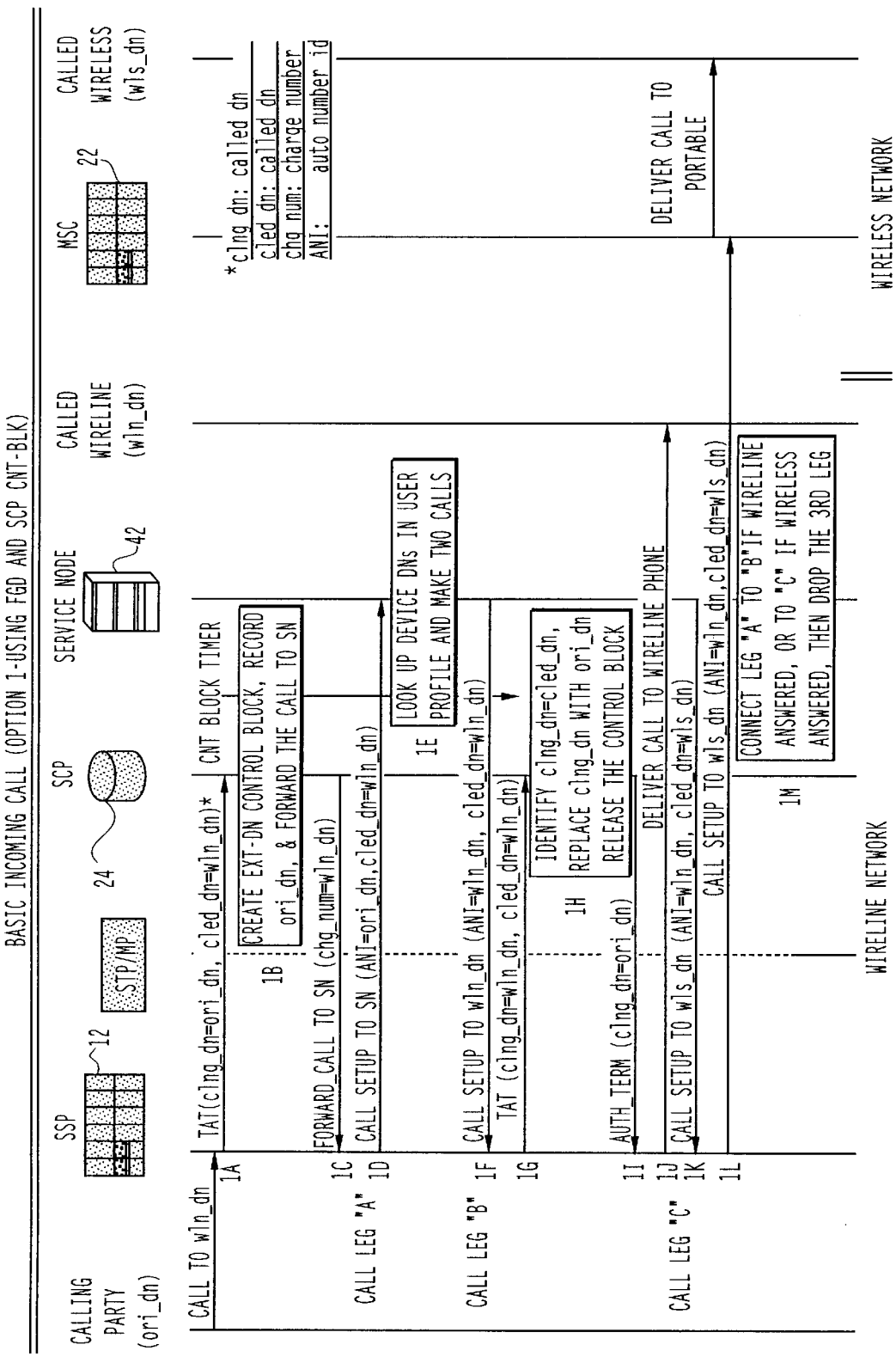
FIG. 8 is a more detailed version of the call flow of FIG. 2 and showing a first method of detecting a second termination attempt (TAT) trigger.

In FIG. 8, a control block including a timer is invoked and used by the SCP 24 to store an incoming call history for a pre-determined amount of time. The SCP 24 includes logic to differentiate between the first and second TAT's (1A & 1G) and then uses the call history to facilitate the passing on of the stored originating DN to, in this case, the wireless telephone. In FIG. 8, the Ext-DN is anchored to the wireline DN and hence the AIN TAT is provisioned for the wireline DN at SSP 12. In response to an incoming call to the wireline DN,(the Ext-DN) the SSP 12 sends a TAT message 1A to the SCP 24. When a TAT message (1A or 1G) is received at the SCP 24, the SCP 24 first determines from the user profile associated with this CallEd DN, if the DN is associated with the Extended DN Service (and hence to be extended) and if so proceeds to check the TAT message to determine if the value found in the Calling field equals the value found in the CallEd field. This situation would normally not be expected as it indicates a party effectively attempting to call themselves. If the two fields are different, the SCP 24 creates a new control block 1B to store the originating or Calling DN and the CallEd DN (wireline DN in this example). The SCP 24 returns an AIN 'Forward Call' message to SCP 12, instructing the SSP 12 to forward the call to the SN 42. The SSP 12 complies by initiating call set up 1D to SN 42 and creates call leg 'A'. In order to correctly charge the Ext-DN subscriber, billing data is preserved on call leg 'A' between SSP 12 and SN 42 by setting the 'Charge Number Parameter' within the 'Forward Call' message to contain the CallEd (Wireline/Ext-DN) DN. The SN 42 looks up all device DNs (two in this example) in a user profile associated with the CallEd DN (Wireline/Ext-DN) and initiates call setup to each one. SN 42 sets up call leg B (1F) to the Wireline DN and call leg C (1K) to the Wireless DN. In both instances the Wireline DN (Ext-DN) is used as the ANI field on the FGD or equivalent trunk. Call set up to the Wireline DN 1F, again initiates a TAT with a corresponding TAT message 1G being sent to the SCP 24. The SSP 12 creates the TAT message, tansparently passing on the WireLine DN in the CallEd DN field and also passes on the WireLine DN it received in the ANI field (1F), in the Calling DN field. When this TAT message (1G) is received at the SCP 24, the SCP 24 again determines from the user profile associated with this CallEd DN that the DN is associated with the Extended DN Service and this time also determines that within the TAT message the Calling DN field equals the value found in the CallEd DN field. This special situation indicates a second call attempt to the Ext-DN and causes SCP 24 to look for the associated control block. The SCP having determined that this is the second TAT or call attempt, instructs SSP 12 to proceed to deliver the call to the Wireline telephone by returning an 'Authorize Termination' AIN message 1I. The presentation of the true originating party's DN to the Wireline telephone is made possible by the SCP 24 modifying certain parameters within the returned Authorize Termination' AIN message 1I. The SCP 12 normally would place the calling DN it receives in the TAT message 1G into the calling DN parameter field in the Authorize Termination' message 1I. However, in this embodiment the SCP 12 inserts into the calling DN parameter field in the Authorize Termination' message 1I, the originating DN it received and recorded in the first TAT message 1A. The true originating party DN will be presented to the Wireline telephone if the wireline subscriber subscribes to the Caller Identification (CLID) service. The SCP 24 then releases or deletes the control block. (It to be noted however that the correct presentation of the originating DN to the wireless telephone is not possible with this particular embodiment.)

FIG. 9 illustrates substantially the same call flow as for FIG. 8 with a variation on the mechanism used to detect the second TAT. The second TAT 2G is distinguished from the first TAT 2A by the presence of a CallEd Party Station Type (CPST) field in the second TAT message 2A having a predetermined value assigned only to the Ext-DN service. A CPST value of 40 has been used in the Call flow of FIG. 9 as it currently has unrestricted use and can be locally determined by a Service Provider. When the SN 42 originates the call leg to the wireline DN 2F it places an ANI Information Index (ANI_II) parameter in the FGD trunk signaling data and sets its value to 40. When the call setup information is received 2F, the SSP 12 places the value of the ANI_II parameter in the CPST field of the TAT message 2G it sends to the SCP 24. On the call legs from the SSP 12 to the SN 42 (call leg A) and from the SN 42 to the Wireline DN (call leg B), the originating party DN is sent over the FGD trunk in the ANI signaling field thus enabling the SSP 12 to present the correct DN to the Wireline telephone if the Wireline customer subscribes to the Calling Identification (CLID) service. In order to correctly charge the Ext-DN (Wireline) subscriber for call legs A & B. the SCP 24 intervenes. When the SCP 24 returns the Forward Call message 2C, directing the SSP 12 to forward the call to the SN 42, the Wireline DN is provided as the Charge Number parameter for call leg A. Similarly, when the second TAT 2G message is handled 2H by the SCP 24, the Wireline DN is placed in the Charge Number field of the returned Authorize Termination message 2I. Correct billing information is preserved in call leg C from the SN 42 to the Wireless DN by having the SN 42 place the CallEd Wireline DN it received on call leg A, into the ANI field for call leg C (2k,2L).

FIG. 10 is a more detailed version of the call flow of FIG. 2 and showing a third method of detecting the second TAT. Service providers prior to using the mechanism described in this embodiment need to provide a dedicated trunk between the SN 42 and the SSP 12 and as well to configure the SCP 24 to recognize the dedicated trunk ID for this configuration. In a similar manner as for the mechanism shown in FIG. 9 call flow steps 3A to 3E of FIG. 10 follow the call flow steps 2A to 2E of FIG. 9. The SN 42 initiates call setup 3F to the Wireline DN on SSP 12 over the dedicated trunk between the SSP 12 and itself (SN 42). TAT messages in general to an SCP 24 may provide trunk ID information for a particular incoming call. Unlike the first TAT message 3A where the trunk ID field is not present at all or is set to an ID representative of a 'normal inter-office trunk', the second TAT message 3G sent by the SSP 12 includes the trunk ID associated with the incoming call to the wireline DN. The trunk ID for calls setup by the SN 42 will always be the same and hence the SCP 24 upon receiving the second TAT can identify it as such by the fact that the trunk ID in the TAT message matches one of the dedicated or reserved trunks between the SN 42 and the SSP 12. Delivery of the correct calling party DN (caller ID (CLID) service) to the Wireline terminal is achieved by having the SSP 12 send the originating party DN in the ANI field 3D on the FGD trunk (call leg A) between the SSP 12 and the SN 42 and then to have the SN 42 include the originating party DN in the ANI field 3F on call leg B between the SN 42 and the SSP 12. In order to correctly bill the subscriber having the Ext-DN (the wireline subscriber in this example) for call legs A & B (3D & 3F respectively) the SCP 24 includes the Wireline DN (the Ext-DN) in the charge number field of the Forward Call message 3C sent to the SSP 12. When the second TAT message is processed (3G & 3H) the Wireline DN is then included in the charge number field of the Authorize Termination message on the call leg 3I between the SCP 24 and the SSP 12. Correct billing information is preserved on the call legs 3K & 3L from the SN 42 to the WireLess DN by including the Wireline DN (Ext-DN) in the ANI field of each call leg 3K & 3L.

FIG. 11 is a more detailed version of the call flow of FIG. 2 and showing a fourth method of detecting the second TAT trigger. The call flow depicted in FIG. 11 is substantially identical to the call flow of FIG. 9 apart from the treatment of the call legs (4K, 4L, 4N, 4O) from the SN 42 to the WireLess DN. In the call flow of FIG. 11 a Public Office Dialing Plan (PODP) trigger is used to facilitate delivery of the originating party CLID information to the WireLess Terminal, while still preserving the correct billing DN (i.e. the Ext-DN in this example). A PODP trigger is provisioned for the trunk group(s) used for call legs (4K, 4L, 4N, 4O) from the SN 42 to the SSP 12 for the call to the WireLess Terminal. When a call leg 4K from the SN 42 to the WireLess terminal is set up on the PODP provisioned trunk to the SSP 12, the originating party DN is used as the calling party DN to preserve the CLID information to the WireLess terminal. For the SCP to be able to distinguish calls to the WireLess terminal from other calls from the Service Node 42, a special PODP DN is used as the CallEd DN on the call leg 4K. The PODP DN is effectively a transformation of the WireLess DN, i.e. the WireLess DN ({actual NPA}-NXX-XXXX) is mapped to a PODP DN ({special PODP NPA}-NXX-XXXX). When the SCP 24 receives an Info_Analyzed (PODP) message 4L containing a PODP DN it uses the NXX-XXXX of this number to retrieve 4M the charge number and the actual area code for the WireLess DN from a subscriber profile within the SCP 24. The SCP 24 then replaces the PDOP DN with the actual retrieved WireLess DN in an Analyze_Route message (4N) sent to the SSP 12. To preserve the correct usage charges for these call legs the AMA Alternate Billing Number is set to the WireLine DN (Ext-DN) and included in the Analyze_Route message (4N).

FIG. 12 is a more detailed version of the call flow of FIG. 2 and showing a fifth method of detecting the second TAT trigger. The call flow depicted in FIG. 12 is substantially identical to the call flow of FIG. 9 as well, apart from the treatment of the call legs (5K, 5L, 5N, 5O) from the SN 42 to the WireLess DN. In the call flow of FIG. 12 an Off-Hook Delay (OHD) trigger is used (instead of the PODP trigger used in the call flow of FIG. 11) to facilitate delivery of the originating party CLID information to the WireLess Terminal, while still preserving the correct billing DN (i.e. the Ext-DN in this example). A OHD trigger is provisioned for the trunk group(s) used for call legs (5K,5L,5N,5O) from the SN 42 to the SSP 12 for the call to the WireLess Terminal. When a call leg 5K from the SN 42 to the WireLess terminal is set up on the OHD provisioned trunk to the SSP 12, the originating party DN is used as the calling party DN to preserve the CLID information to the WireLess terminal.

For the SCP to be able to distinguish calls to the WireLess terminal from other calls from the Service Node 42, a special OHD DN is used as the CallEd DN on the call leg 5K. The OHD DN is effectively a transformation of the WireLess DN, i.e. the WireLess DN ({actual NPA}-NXX-XXXX) is mapped to a OHD DN ({special OHD NPA}-NXX-XXXX). When the SCP 24 receives an Info_Collected (OHD) message 5L containing a OHD DN it uses the NXX-XXXX of this number to retrieve 5M the charge number and the actual area code for the WireLess DN from a subscriber profile within the SCP 24. The SCP 24 then replaces the OHD DN with the actual retrieved WireLess DN in an Analyze_Route message (5N) sent to the SSP 12. To preserve the correct usage charges for these call legs the AMA Alternate Billing Number parameter is set to the WireLine DN (Ext-DN) and included in the Analyze_Route message (5N).

Service providers (SP) of either a wireless or wired network may provide this service for their own respective customers or subscribers irrespective of the other network. For example a wired network SP may have a subscriber of their network identify a wired DN as the Ext-DN and provide one or more other wired DN's for the SP to alert simultaneously in response to incoming calls to Ext-DN. In such cases trunk connections to a wireless network are not a requirement. Similarly, a wireless network SP may have a subscriber of their network identify a wireless DN as the Ext-DN and provide one or more other wireless DN's for the wireless SP to alert simultaneously in response to incoming calls to the (wireless) Ext-DN irrespective of any inter-network trunk connections.

It is also to be recognized that other embodiments are contemplated by the inventor. For example, a subscriber to such an Ext-DN service may desire the added flexibility of being able to select a sub group of terminals listed in a profile to be alerted in response to an incoming call, which may or may not include the Ext-DN being alerted. If for example a subscribers residence phone is the DN to which the service is anchored, i.e. the residence DN becomes the Ext-DN, and that subscriber knows that for the next few hours they will be traveling in their car, they may wish to have only their wireless DN alerted in response to an incoming call to their residence DN (the Ext-DN). This flexibility would allow important calls to a subscriber not to be missed simply because a family member may have answered in this example, the residence terminal before the subscriber in their car answered on their wireless terminal.

Numerous ways in which to provide this flexibility are contemplated. For example a subscriber may either through an operator or an interactive dialing interface, modify at will their profile to add or delete directory numbers. With more recent technology such as the Internet, users can access personal profiles using World Wide Web forms or Java Applets. A subscriber profile may also be configured to contain a list of DN's and to associate a field with each DN which is modifyable by a subscriber at will to identify which DN's in the list are active (to be alerted) or not active (not to be alerted). Yet a further way in which to provide this flexibility would be to provide a subscriber with a plurality of profiles and the subscriber would then identify either through an operator or an interactive dialing interface, identify which one of the profiles is to be the active profile. A further extension of this would be to allow a subscriber to pre-select which one of a plurality of profiles is to be the active profile at different points in the day, thus minimizing the number of times a subscriber would need to interac with a profile management system.

The implementation previously described in relation to the call flow illustrated in FIG. 8, would provide the flexibility and functionality in scenarios where the Ext-DN (the residence DN in the example above) is not to be alerted. The call flow of FIG. 8 would however vary slightly. In operation the Sn 42 would initiate call set up to the wireless DN but not to the wireline DN (Ext-DN) and hence call flow steps 1K and 1L would take place but steps 1F, 1G, 1H, 1L and 1J would not take place. Steps 1K and 1L would result in the incoming call being delivered to the wireless DN but not to the Wireline DN, with the result that the timer associated with the control block 1B would time out. The control block 1B would then be dropped for that particular incoming call and the system would thus be ready for the next incoming call to the Ext-DN.

What is claimed is:

1. A method of extending a subscriber directory number (DN) to one or more terminals each of which have different network directory numbers, comprising the steps of:

(a) in response to an incoming call from a calling party to the subscriber directory number associated with a switch, flagging at said switch that the incoming call to the subscriber directory number requires special treatment and temporarily suspending regular call processing;

(b) determining that the subscriber DN is one which is to be extended to include one or more terminals, each having different network directory numbers and determining that the incoming call is a first call attempt to the subscriber DN;

(c) determining the DN of all terminals to which the subscriber DN is to be extended; and (d) initiating call setups to the subscriber directory number and to each DN determined in step (c) and alerting the terminal associated with the subscriber DN along with the terminals associated with the DN's determined in step (c).

2. The method of claim 1 wherein the step of alerting the terminal associated with the subscriber DN and each DN determined in step (c) is done sequentially.

3. The method of claim 1 wherein the step of alerting the terminal associated with the subscriber DN and each DN determined in step (c) is done substantially simultaneously.

4. The method of claim 3 further comprising the step of establishing a voice path between the calling party and whichever alerted terminal in step (d) goes off hook first.

5. A method of extending a subscriber directory number (DN) to one or more terminals each of which have different network directory numbers, comprising the steps of:

(a) in response to an incoming call from a calling party to the subscriber directory number associated with a switch, flagging at said switch that the incoming call to the subscriber directory number requires special treatment, and temporarily suspending regular call processing;

(b) determining that the subscriber DN is one which is to be extended to include one or more terminals, each having different network directory numbers and determining that the incoming call is a first call attempt to the subscriber DN during the call processing of the incoming call;

(c) determining the DN of all terminals to which the subscriber DN is to be extended; and (d) initiating call set-ups to the subscriber directory number and to each DN determined in step (c).

6. The method of claim 5 wherein steps (c) and (d) are preformed at a service node.

7. The method of claim 5 further comprising the steps of determining that the incoming call is a second call attempt to the subscriber DN during the call processing of the incoming call and subsequently routing the call to the subscriber DN.

8. The method of claim 7 wherein the step of flagging that the incoming call to the subscriber DN requires special treatment is provided for by provisioning a switch event trigger against the subscriber DN which occurs in regular call processing prior to alerting.

9. The method of claim 8 wherein the step of determining that the subscriber DN is one which is to be extended is provided for by examining a user profile in response to an associated switch event occurrence.

10. The method of claim 8 wherein the switch event trigger is an Advanced Intelligent Network (AIN) trigger and the step of determining that the subscriber DN is one which is to be extended is provided for at a Service Control Point (SCP) in response to receiving a corresponding AIN trigger 'event message' from the switch.

11. The method of claim 10 wherein the switch event trigger is an AIN 'termination attempt' trigger and the event message is a corresponding 'termination attempt' message.

12. The method of claim 10 or wherein the first and second call attempts to the subscriber DN are determined by the SCP examining switch event messages associated with the switch event trigger during the call processing of the incoming call, and associating a first call attempt with receiving a first event message and associating a second call attempt with receiving a second occurrence of the same switch event message during the call processing of the incoming call.

13. The method of claim 7 further comprising the step of alerting the terminal associated with the subscriber DN along with the terminals associated with the DNs determined in step (c).

14. The method of claim 13 wherein the step of alerting the terminal associated with the subscriber DN and each DN determined in step (c) is done substantially simultaneously.

15. The method of claim 14 further comprising the step of establishing a voice path between the calling party and which ever alerted terminal goes off hook first.

16. The method of claim 13 wherein the step of alerting the terminal associated with the subscriber DN and each DN determined in step (c) is done sequentially.

17. In a telecommunications network, a system for extending a subscriber directory number (DN) to one or more terminals each of which have different network directory numbers, said system comprising:

(a) means for flagging at a switch that an incoming call to the subscriber directory number requires special treatment and temporarily suspending regular call processing of the incoming call;

(b) means for determining that the subscriber DN is one which is to be extended to include one or more terminals, each having different network directory numbers, and that the incoming call is a first call attempt to the subscriber DN during the call processing of the incoming call and in response to the first call attempt;

(c) means for determining the DN of all terminals to which the subscriber DN is to be extended; and (d) means for initiating substantially simultaneously call set-ups to the subscriber directory number and to each DN determined by the means for determining the DN of all terminals.

18. The system of claim 17 further comprising means for determining that the incoming call is a second call attempt to the subscriber DN during the call processing of the incoming call and subsequently routing the call to the subscriber DN.

19. The system of claim 18 further comprising means for alerting substantially simultaneously, the terminal associated with the subscriber DN along with the terminals associated with the DN's determined by the means for determining the DN of all terminals, and establishing a voice path between the calling party and which ever of the alerted terminals goes off hook first.

20. The system of claim 19 including means for releasing call legs to terminals other than the first terminal to have gone off hook.

* * * * *